(12) United States Patent
Sarkar et al.

(10) Patent No.: US 11,544,216 B2
(45) Date of Patent: Jan. 3, 2023

(54) INTELLIGENT DATA ACCESS ACROSS TIERED STORAGE SYSTEMS

(71) Applicant: Western Digital Technologies, Inc., San Jose, CA (US)

(72) Inventors: Sanhita Sarkar, Fremont, CA (US); Kannan J. Somangili, Pleasanton, CA (US); Shanker Valipireddy, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 723 days.

(21) Appl. No.: 16/394,687

(22) Filed: Apr. 25, 2019

(65) Prior Publication Data

US 2020/0341943 A1 Oct. 29, 2020

(51) Int. Cl.
*G06F 16/00* (2019.01)
*G06F 16/11* (2019.01)
*G06F 3/06* (2006.01)
*G06F 16/14* (2019.01)
*G06N 20/00* (2019.01)

(52) U.S. Cl.
CPC ............ *G06F 16/113* (2019.01); *G06F 3/067* (2013.01); *G06F 3/0608* (2013.01); *G06F 3/0611* (2013.01); *G06F 3/0643* (2013.01); *G06F 16/156* (2019.01); *G06N 20/00* (2019.01)

(58) Field of Classification Search
None
See application file for complete search history.

(56) References Cited

U.S. PATENT DOCUMENTS

| | | | |
|---|---|---|---|
| 10,572,159 B1* | 2/2020 | Thrane | G06F 3/0649 |
| 2011/0138131 A1* | 6/2011 | Regni | G06F 9/5077 711/133 |
| 2016/0342655 A1* | 11/2016 | Mishra | G06F 16/283 |
| 2018/0191867 A1 | 6/2018 | Siebel et al. | |
| 2018/0203744 A1 | 7/2018 | Wiesmaier et al. | |
| 2020/0241967 A1* | 7/2020 | Dain | G06F 11/1469 |

OTHER PUBLICATIONS

Ren, K., et al., TABLEFS: Embedding a NoSQL Database Inside the Local File System, May 2012, p. 1-8, Parallel Data Laboratory, Carnegie Mellon University, Pittsburgh, PA 15213-3890.

* cited by examiner

*Primary Examiner* — Alexander Khong
(74) *Attorney, Agent, or Firm* — Patent Law Works LLP

(57) ABSTRACT

Example tiered storage systems, storage devices, and methods provide intelligent data access across tiered storage systems. An example system can comprise one or more computing devices, a file system, an object storage system comprising an object storage, and a data tiering application. The data tiering application is executable by one or more computing devices to perform operations comprising determining, using machine learning logic, a cluster of associated files stored in the file system; and archiving the cluster of associated files from the file system to the object storage coupled for electronic communication to the file system via a computer network.

20 Claims, 13 Drawing Sheets

| Ending with | Frequent File sets |
|---|---|
| f5 | {f5}, {f4, f5}, {f1, f4, f5}, {f3, f5}, {f1, f5} |
| f4 | {f4}, {f3, f4}, {f2, f3, f4}, {f1, f3, f4}, {f2, f4}, {f1, f2, f4}, {f1, f4} |
| f3 | {f3}, {f2, f3}, {f1, f2, f3}, {f1, f3} |
| f2 | {f2}, {f1, f2} |
| f1 | {f1} |

| File set | Support Count (>= minsup) |
|---|---|
| {f1} | 8 |
| {f2} | 7 |
| {f3} | 6 |
| {f4} | 5 |
| {f5} | 3 |
| {f1, f2} | 5 |
| {f1, f3} | 4 |
| {f1, f4} | 4 |
| {f1, f5} | 2 |
| {f2, f3} | 5 |
| {f2, f4} | 3 |
| {f3, f4} | 3 |
| {f3, f5} | 2 |
| {f4, f5} | 2 |
| {f1, f2, f3} | 3 |
| {f1, f2, f4} | 2 |
| {f1, f3, f4} | 2 |
| {f1, f4, f5} | 2 |
| {f2, f3, f4} | 2 |

INTELLIGENT DATA ACCESS ACROSS TIERED STORAGE SYSTEMS

TECHNICAL FIELD

The present disclosure generally relates to data storage systems, and in a more particular example, to tiered data storage systems.

BACKGROUND

Data from Internet-of-things (IoT) devices, is often streamed data from edge devices to managing server(s) containing high-performance file systems so analytics may be generated based on the streamed data that provide actionable insights. For example, shown in FIG. 8, users running IoT applications (for example, in car manufacturing industry) on IoT devices (e.g., sensors in cars) tend to use high-performance file systems (often based on all-flash arrays) to ingest streaming data from these edge devices. After ingestion, the data is processed and/or analyzed (often in real-time) for different immediate needs.

After being analyzed or processed, the data is archived from the high-performance file systems to an archival tier (e.g., cold storage). For example, the data may be transferred to longer-term storage, such as a Hadoop™ instance, an object storage system, or other repository.

Later, this archived data often needs to be retrieved from the archive from time-to-time by the file system and/or application(s) to make updates, add additional metadata, add new tags, correlate with the newly ingested stream in real-time, find and add new patterns, and make immediate predictions that are critical to the implementation.

However, restoring data to a high-performance file system from the archive can be problematic. Object stores are not as fast as the file systems, which introduces bottlenecks, such as lag affecting data transfer and speeds, access frequency, and transparency. For instance, existing solutions are unable to transfer, tier, archive, etc., instantaneously between a high-performance file system and archival storage, such as an object storage system.

In some cases, users have attempted to implement custom solutions for transparent tiering, archival, and retrieval of data between a high-performance file system (e.g., file system with all-flash arrays) and an object storage system. However, such custom solutions are inflexible and difficult to adapt for scale.

Other solutions, such as Hadoop™, do not intelligently group files for tiering and restoration, do not provide any near-real-time search or finding capabilities and fail to track facts (e.g., such as where individual files are stored). As a result, all files in a given timeframe or having a given capacity are generally restored to the file system regardless of whether some of the files are even relevant to the current data processing operations, resulting in slower and unnecessarily wasteful and inefficient transfer and processing of data from the cold to the hot data tiers.

SUMMARY

Various aspects related to tiered storage are described. In an innovative aspect, a data storage system includes: one or more computing devices; a file system; an object storage system including an object storage; and a data tiering application executable by one or more computing devices to perform operations including: determining, using machine learning logic, a cluster of associated files stored in the file system; and archiving the cluster of associated files from the file system to the object storage coupled for electronic communication to the file system via a computer network. Other embodiments of this aspect include corresponding computer systems, apparatus, and computer programs recorded on one or more computer storage devices, each configured to perform the actions of the methods.

In one or more implementations, a system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

Implementations may include one or more of the following features: receiving a request for an archived file; identifying, in the object storage, the cluster of associated files containing the requested archived file; restoring the cluster of associated files including the requested archived file to the file system where the requested archived file now includes a restored file system file; performing an operation associated with the restored file system file; notifying about an availability of the restored file system file; where determining, using the machine learning logic, the cluster of associated files stored in the file system further includes determining a plurality of frequent file sets based on access patterns, and generating the cluster of associated files based on the frequent file sets; generating a pattern data structure; deriving the frequent file sets from the pattern data structure; where the object storage system includes a key-value store; where archiving the cluster of associated files from the file system to the object storage system includes compressing the cluster of associated files into a compressed object, storing the compressed object in the object storage, generating metadata for the compressed object, and storing the metadata in the key-value store; where storing the metadata in the key-value store includes storing the metadata as key-value pairs in the key-value store, and indexing the key-value pairs in an index of the key-value store; where the operations further include receiving a request for an archived file, searching the index of the key-value store for the archived file, retrieving a path of the compressed object containing the archived file using a corresponding key stored in the key-value store, and restoring the associated files from the compressed object stored in the object storage to the file system at respective original file paths; where restoring the associated files from the compressed object stored in the object storage to the file system using the respective original file paths further includes retrieving the compressed object from the object storage, decompressing the archived file and the associated files from the compressed object, and restoring the associated files in the file system at the respective original file paths; and where the operations further include deleting the compressed object from the object storage, and updating the index of the key-value store to reflect the deletion of the compressed object. Some implementations of the described techniques may include hardware, a method or process, or computer software on a computer-accessible medium.

One innovative aspect includes a computer-implemented method including: polling for one or more dormant files stored in a file system of a computing device; determining, using machine learning logic, a cluster of associated files including the one or more dormant files; archiving the cluster of associated files from the file system to an archival object storage system coupled to the file system via a computer network; and deleting the associated files including the cluster of associated files from the file system. Some other embodiments of this aspect include corresponding computer systems, apparatus, and computer programs recorded on one or more computer storage devices, each configured to perform the actions of the methods.

Implementations may include one or more of the following features: receiving a request for an archived file at the computing device; identifying the cluster of associated files containing the requested archived file in the archival object storage system; restoring the associated files including the requested archived file to the file system; where the requested archived file now including a restored file system file; performing an operation associated with the restored file system file; where determining, using the machine learning logic, the cluster of associated files including the one or more dormant files includes determining a plurality of frequent file sets based on access patterns, and generating the cluster of associated files based on the frequent file sets; where determining the plurality of frequent file sets based on the access patterns includes generating a tree-like data structure, and deriving the frequent file sets from the tree-like data structure; where archiving the associated files from the file system to the archival object storage system includes compressing the associated files into a compressed object, storing the compressed object in object storage, generating metadata for the compressed object and the associated files compressed into the compressed object, and indexing the metadata for searching; responsive to indexing the metadata for searching, deleting the associated files from the file system and a temporary storage used during the archiving; where indexing the metadata for searching includes storing the metadata as key-value pairs in a key-value store, and indexing the key-value pairs in an index of the key-value store; receiving a request for an archived file; searching the index of the key-value store for the archived file; retrieving a path of the compressed object containing the archived file from the key-value store; restoring the associated files from the compressed object to the file system at respective original file paths; and where restoring the associated files from the compressed object to the file system at the respective original file paths further includes retrieving the compressed object from the object storage, decompressing the archived file and the associated files from the compressed object, and restoring the associated files from the archived file in the file system at the respective original file paths. Some implementations of the described techniques may include hardware, a method or process, or computer software on a computer-accessible medium.

One innovative aspect includes a storage system including: means for polling for one or more dormant files stored in a file system of a computing device; means for determining, using machine learning logic, a cluster of associated files including the one or more dormant files; and means for archiving the cluster of associated files from the file system to an object storage via a computer network. Some other embodiments of this aspect include corresponding computer systems, apparatus, and computer programs recorded on one or more computer storage devices, each configured to perform the actions of the methods.

Some implementations may include one or more of the following features: means for receiving a request for an archived file at the computing device; means for identifying the cluster of associated files containing the requested archived file in the object storage; means for restoring the associated files including the requested archived file to the file system to their respective original locations, the requested archived file now including a restored file system file; and means for performing an operation associated with the restored file system file. Implementations of the described techniques may include hardware, a method or process, or computer software on a computer-accessible medium.

The various embodiments described herein are beneficial in a number of respects and provides numerous advantages over existing tiered storage systems. For example, the technology advantageously provides a standardizable data access solution that uses machine learning to predict, based on frequent patterns of access and close associations, a group of files to move and restore transparently, which can beneficially preserve bandwidth by reducing the number of future file transfers and enhance speed of access. The technology can also provide a solution for near-real time search for the individual files and is capable of identifying the paths to the files in back-end object storage. Further, the technology is applicable to standard file systems, provides intuitive metadata management of object paths, original file paths, hostnames, and other attributes, and can use the foregoing information to extend the technology to various other use cases or other user needs.

Additionally, the various embodiments include operations to overcome or at least reduce the issues in the previous storage systems discussed above and, accordingly, are more efficient and scalable than other computer data storage architectures for some applications. That is, the various embodiments disclosed herein include hardware and/or software with functionality to improve the efficiency and scalability of tiered data management operations. Accordingly, the embodiments disclosed herein provide various improvements to storage systems.

It should be understood that language used in the present disclosure has been principally selected for readability and instructional purposes, and not to limit the scope of the subject matter disclosed herein.

BRIEF DESCRIPTION OF THE DRAWINGS

FIG. 5 illustrates a table of example frequent files sets derived from the conditional trees.

FIG. 6 illustrates a table of example frequent files sets sorted by support count.

DETAILED DESCRIPTION

The innovative data storage technology described herein can provide for intelligent data access across tiered storage systems, such as by reducing the number of future transfers across the storage tiers and enhancing the speed of file access.

A tiered storage system may be used to store hot, warm, and cold tiers of data for various applications. In some embodiments, the tiered storage systems may comprise high-performance file systems and object storage systems. The file systems may comprise storage systems including solid-state storage devices, magnetic storage devices, and other suitable storage mediums.

In some embodiments, the technology may use machine learning to predict a group of files to move and restore between tiers, thus reducing the number of future file transfers. The file predictions may be based on frequent, or deriving frequent access patterns and close associations. For example, frequent file access patterns and close/strong association rules for the files may be machined learned, and the technology may use the association rules to optimally group and tier the files for restoration into the file system, which advantageously provides for transparent and quicker access to the files.

In some embodiments, the technology can intelligently cluster closely-associated files to archive and restore across the tiers with metadata management of object paths, original file paths, hostnames, etc., for near-real-time search and access to those files.

Advantageously, in an example implementation as a product or a service along with large-scale (e.g., petabyte-scale or greater), the technology can provide an out-of-the-box solution to access data intelligently across flash and object tiers, with speed and transparency, while maintaining a low-capital expenditures freeing up expensive capacity in more expensive, faster storage tiers (e.g., flash storage tier) and instead retaining critical data in the faster storage tier for immediate data processing needs; extensively using the faster storage tier(s) for use cases requiring fast response times (e.g., machine learning based on association rule mining for identifying patterns of file access); and dramatically increasing the volume of data to archive at a low cost per unit storage (e.g., gigabyte) due to the ability of intelligent clustering of many files for archive at once, etc.

Figure 1A:
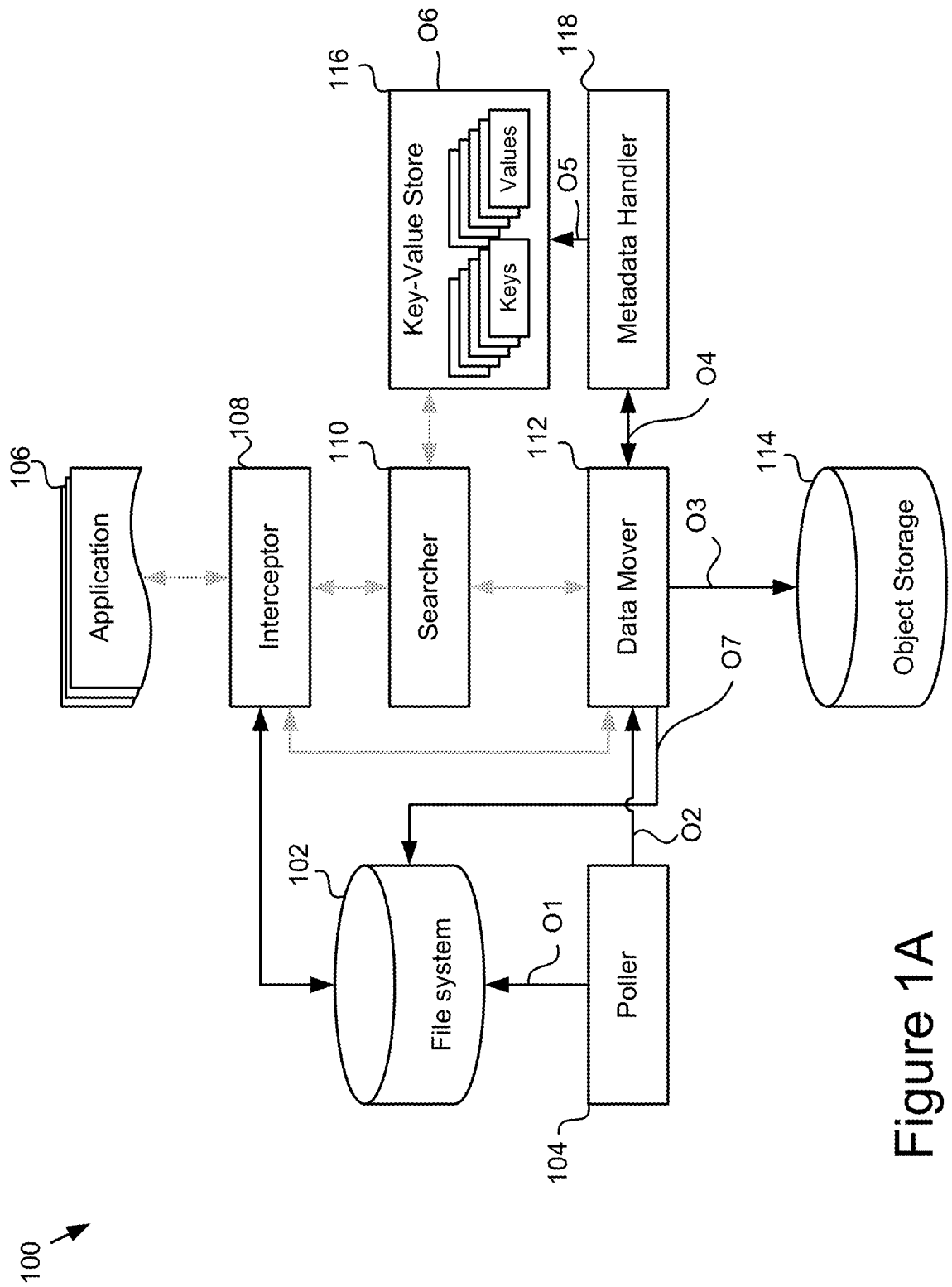
FIGS. 1A and 1B schematically illustrate example processes for intelligent data archiving and access across tiered storage systems.
Figure 1B:
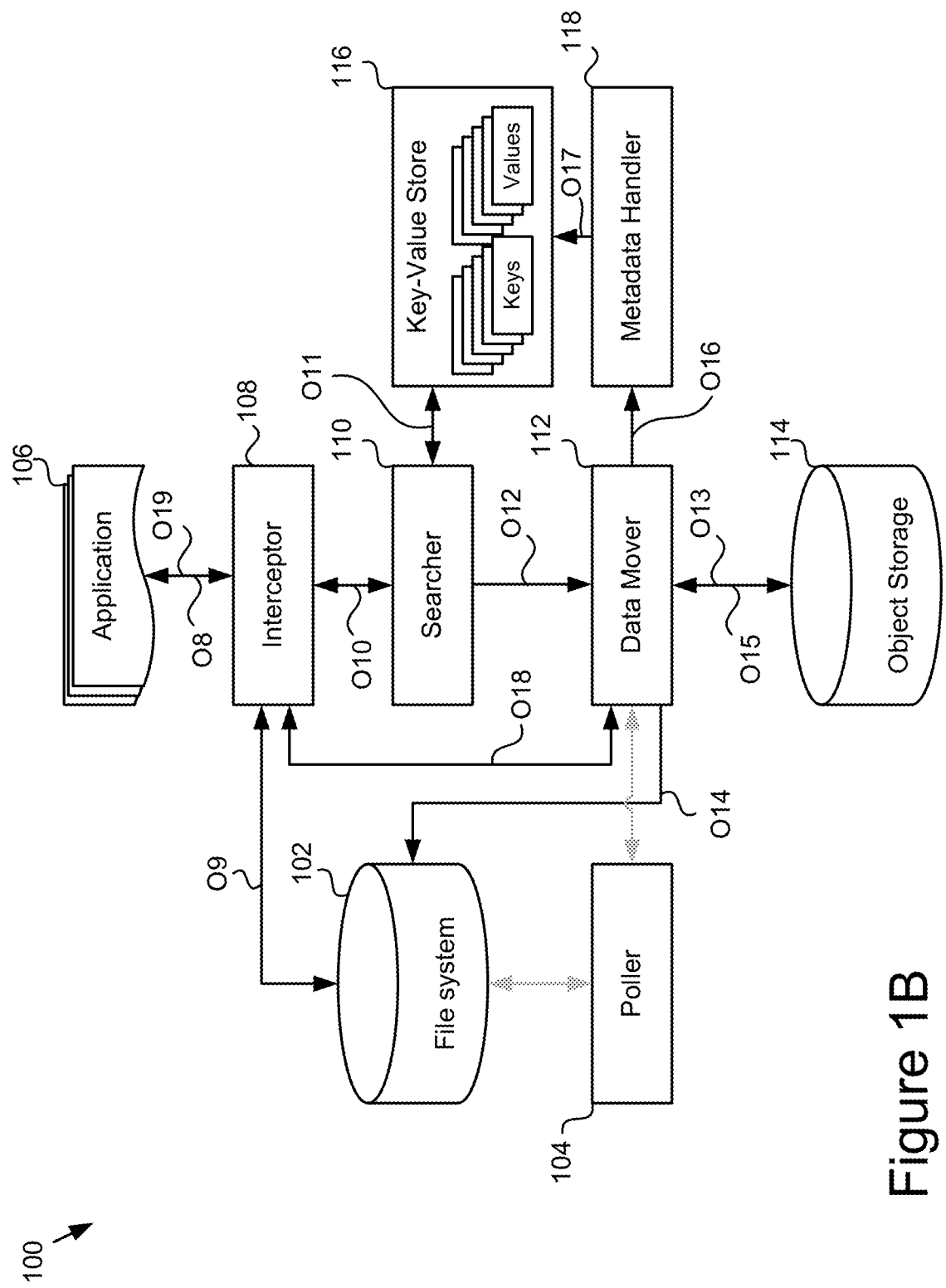

FIGS. 1A and 1B schematically illustrate example processes 100 for intelligent data archiving and access across tiered storage systems. Components comprising a data storage system, such as the data storage system 700 depicted in FIG. 7, may carry out the acts and/or functionality depicted in the process 100. For convenience, elements depicted in FIGS. 1A, 1B, and 7 are described together.

Figure 7:
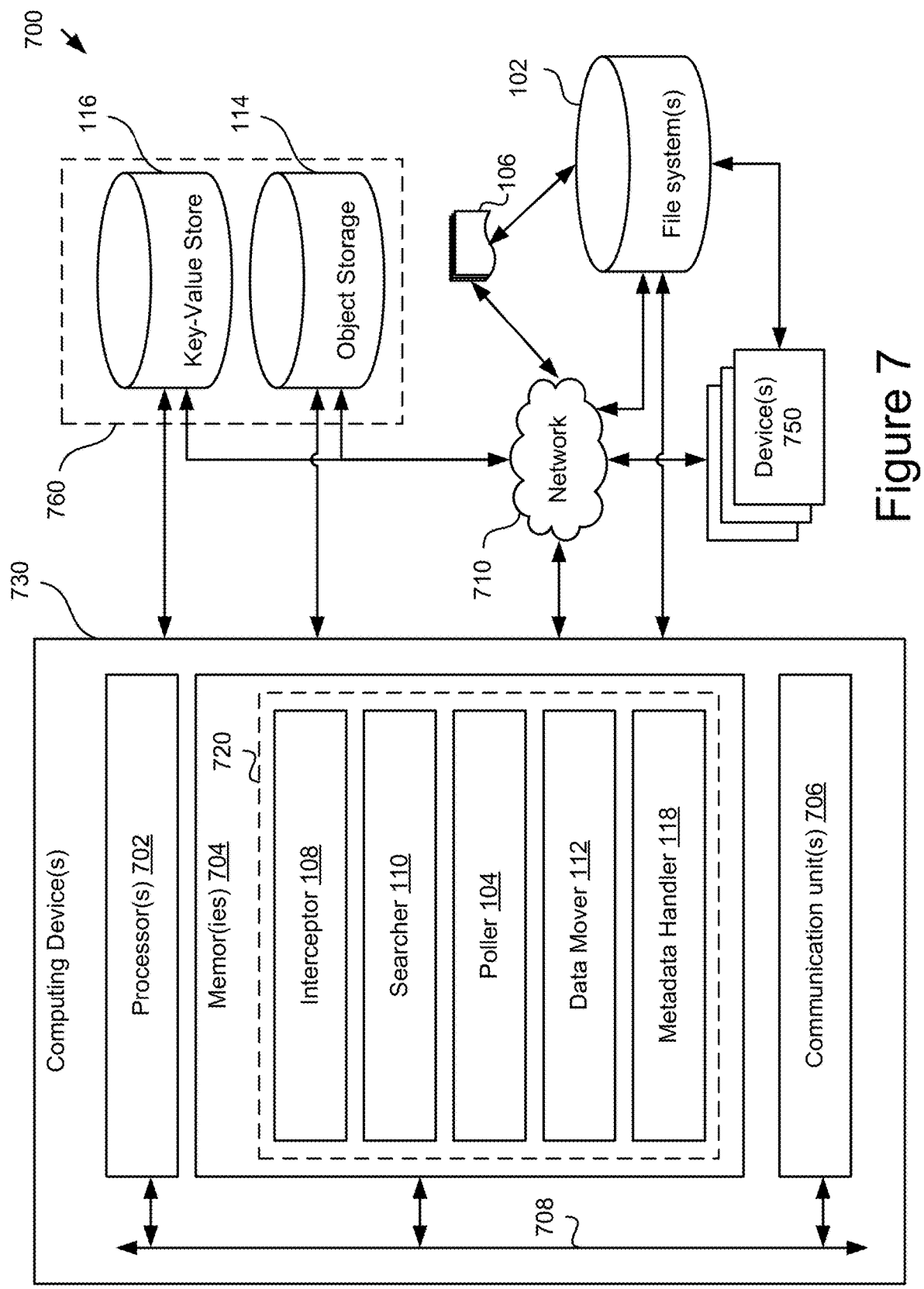
FIG. 7 schematically illustrates an example storage system.
Figure 8:
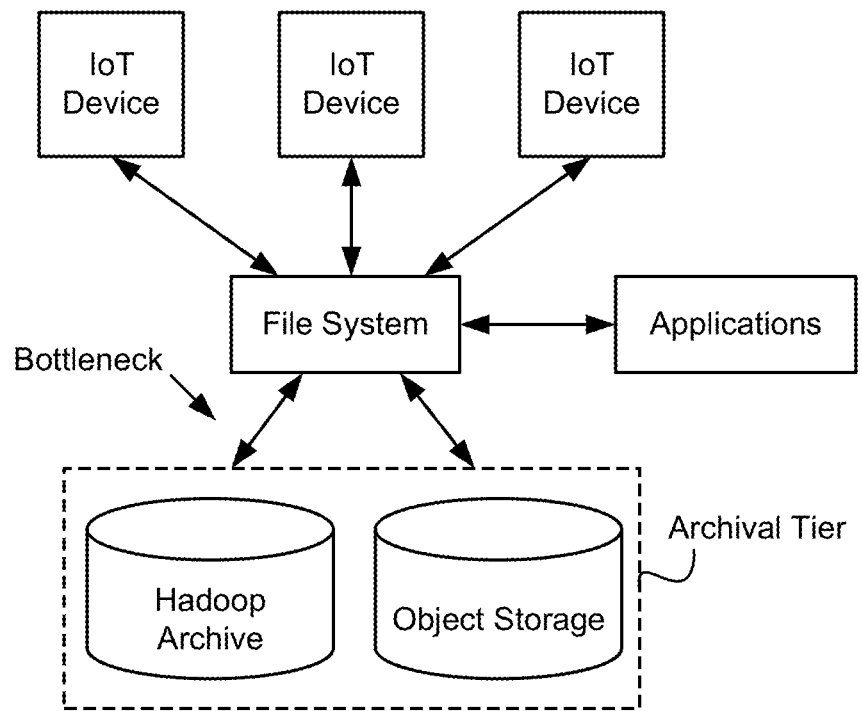
FIG. 8 schematically illustrates an example prior storage configuration.

FIG. 7 in particular, schematically illustrates the example data storage system 700, which comprises one or more computing devices 730 having an instance of a data tiering application 720, a data archive 760 (also referred to herein as an archival object storage system), one or more applications 106, one or more file systems 102, and one or more devices 750, which may be directly coupled for electronic communication and/or coupled for electronic communication via a computer network 710. A computing device 730 may include one or more processors 702, memor(ies) 704, and/or communication unit(s) 706. A computing device 730 may further include other components as needed (e.g., input devices, output devices, other interfaces, processors, non-transitory storage devices, etc.).

A computing device 730 may include any computer (e.g., a server or client) known or developed in the future that is capable of performing data processing tasks, accessing the storage device(s), and communicating with other electronic devices via the network 710. By way of example and not limitation, a computing device 730 may include one or more hardware servers, server arrays, storage devices and/or systems, etc., and/or may be centralized or distributed/cloud-based. In some embodiments, a computing device 730 may include one or more virtual servers, which operate in a host server environment and access the physical hardware of the host server including, for example, a processor, memory, storage, network interfaces, etc., via an abstraction layer (e.g., a virtual machine manager).

As explained in more detail below, a computing device 730 may execute various software programs such as software (e.g., operating systems, firmware compilers, drivers, applications, etc.). The computing device 730, as part of its respective operation, may rely on sending input/output (I/O) requests to local and/or remote storage device(s) to write data, read data, and/or modify data, etc. For instance, the computing device 730 can transmit I/O requests to write, read, store, communicate, propagate, and/or transport instructions, data, computer programs, software, code, routines, etc., to storage systems, such as the file system(s) 102, the memor(ies) 704, the data archive 760, etc. Storage systems can be accessed by computing device(s) 730 and/or communication with storage systems can be initiated by computing device(s) 730 through a network socket (not shown) utilizing one or more inter-process networking techniques, although other suitable communication configurations and/or protocols are also possible, applicable, and contemplated. In some embodiments, computing device 730 and storage systems may comprise at least a portion of a client-server model.

A device 750 may include hardware components configured for data processing, storage, display, input, and electronic communication. A device 750 may couple to and communicate with other components of the system 700 directly and/or via the network 710 using a wireless and/or wired connection. In some embodiments, some devices 750 may comprise internet of things devices, such as appliances, electronics, sensors, or other suitable devices. In some embodiments, users may interact with a device 750 using one or more input/output devices (e.g., keyboards, mice, touchscreens, etc.).

In some embodiments, device(s) 750 may transmit data at various intervals via an interface to a computing device 730, which may embody a host device configured to manage the device(s) 750. A device 750 may store and execute software for operating the device and carrying out various applications. Example software may be stored in a non-transitory memory of the device 750 and/or by a processor of the device 750 to provide perform various functionality, operate sensor(s), collect and process data, provide for user interaction, receive user input, present information to the user via a display, and/or send data to and receive data from the other entities of the system 700 via the network 710, such as a file system 102, a computing device 730, etc.

By way of example and not limitation, device(s) 750 may comprise remote vehicle sensors and/or vehicle computers deployed in vehicles that travel various roadways and transmit sensor data for analysis by a management system. For example, the sensor data may be analyzed to determine vehicle and/or vehicle component health, traffic conditions, make autonomous driving determinations, train machine learning algorithms, etc. Numerous other applications are also applicable, such as but not limited to, inventory tracking systems, distribution management systems, asset management systems, consumer and/or enterprise applications, etc.

The data archive 760 may comprise an object storage 114 and a key-value store 116. The data tiering application 720 may provide an object storage service, manage data storage using the key-value store 116 and the object storage 114 (e.g., store, index, retrieve, and/or manipulate data in the key-value store 116, store and retrieve data objects to and from the object storage 114, etc.), process requests received from various entities (e.g., computing devices 730, devices 750, a local application, etc.), and perform other acts, as discussed further herein. A non-limiting example of the data archive 760 may include storage systems that are compatible with the Amazon Simple Storage Service (S3) object storage service such as ActiveScale™, other local and/or cloud-based S3 storage systems.

In some embodiments, the object storage 114 may comprise a plurality of storage devices, servers, software applications, and other components, such as but not limited to any suitable enterprise data grade storage hardware and software. Similarly, the key-value store 116 may reside on one or more servers, may be distributed across two or more computing systems (e.g., server systems), etc. In some embodiments, the data tiering application 720 may be a local application receiving local and/or remote storage requests from other clients (e.g., local applications, remote applications, etc.). In some embodiments, the key-value store 116 and/or the object storage 114 may be included in the computing device(s) 730 or in another computing system and/or storage system distinct from but coupled to or accessible by the computing device(s) 730.

The key-value store 116 may comprise a database that stores an ordered set of object key entries, as discussed in further detail elsewhere herein. The key-value store 116 may store and index values from the metadata handler to make them searchable in near-real time. The key-value store may receive and process search requests from the searcher 110, and return matching results.

In some embodiments, the data archive 760 stores entries in the key-value store 116 reflecting data manipulation operations performed on objects (e.g., read, modify, write, etc.) stored in the object storage 114. Entries may be stored responsive to object storage requests received by a storage service, such as but not limited to, put, get, delete, list, etc. The storage service may instruct a key-value store controller to record the data manipulation operations. For example and not limitation, the storage service can call corresponding methods of the key-value store controller configured to perform the various storage functions and acts as needed depending on the configuration.

In some embodiments, the key-value store 116 may comprise a horizontally partitioned database, although other suitable database configurations are also possible and contemplated. Depending on the configuration, database shards may be implemented on different physical storage devices, as virtual partitions on the same physical storage device, or as any combination thereof.

The object storage 114 comprises one or more data stores for storing data objects. The object storage 114 may be implemented across a plurality of physical storage devices. In some example embodiments, the plurality of physical storage devices may be located at disparate locations. Objects stored in the object storage 114 may be referenced by object key entries stored in the key-value store 116. In some example embodiments, multiple copies of a given object or portions thereof (e.g., erasure-encoded copies) can be stored at different physical storage devices to protect against data loss through system failure or to have the object quickly accessible from different geographic locations.

The processor(s) 702 may execute software instructions by performing various input/output, logical, and/or mathematical operations. The processor(s) 702 may have various known or future computing architectures to process data signals. The processor(s) 702 may be physical and/or virtual, and may include a single processing unit and/or core or a plurality of processing units and/or cores. In some embodiments, the processor(s) 702 may be coupled to the memor(ies) 704 via a communication bus 708 to access data and instructions therefrom and store data therein. The bus 708 may couple the processor(s) to the other components of the system 700, for example, memor(ies) 704, communication unit(s) 706, physical storage devices and/or storage systems (e.g., object storage 114, key-value store 116, etc.).

The memor(ies) 704 may store and provide access to data to the other components of the system 700. The memor(ies) 704 may store instructions and/or data that may be executed by the processor(s) 702. For example, the memor(ies) 704 may store an instance of the data tiering application 720 and/or one or more of its components, cached keys and objects, parameters, operating system(s), drivers, databases, and/or other software applications, etc. The memor(ies) 704 may be coupled to the bus 708 for communication with the processor(s) 702 and the other components of system 700. The memor(ies) 704 may include a non-transitory computer-usable (e.g., readable, writeable, etc.) medium, which can be any non-transitory apparatus or device that can contain, store, communicate, propagate, or transport instructions, data, computer programs, software, code, routines, etc., for processing by or in connection with the processor(s) 702. In some embodiments, the memor(ies) 704 may include one or more of volatile memory and non-volatile memory (e.g., RAM, ROM, flash, solid state drive, hard drive, optical disc, tape, magnetic diskette, etc.). It should be understood that the memor(ies) 704 may include a single device or may include multiple types of devices and configurations.

The communication unit 706 may include one or more interface devices for wired and wireless communication with the network 710 and the other entities and/or components of the system 700 including, for example, the other computing device(s) 730, device(s) 750, data archive 760, key-value store 116, object storage 114, file system(s) 102, application(s) 106, etc. In some embodiments, the communication unit 706 can link the processor(s) 702 to the network 710, which may, in turn, be coupled to other processing systems. The communication unit 706 can provide other connections to the network 710 and to other entities of the system 700 using various communication protocols, including, for example, those discussed elsewhere, herein. In some instances, the communication unit 706 includes a wired port and a wireless transceiver.

In some embodiments, the system 700 may include a software communication mechanism implemented via the network 710 and/or communication bus 708 that can include and/or facilitate, for example, inter-method communication, local function or procedure calls, remote procedure calls, an object broker (e.g., common object request broker architecture (CORBA)), direct socket communication (e.g., transmission control protocol/internet protocol (TCP/IP) sockets) among software modules, user datagram protocol (UDP)

broadcasts and receipts, hypertext transfer protocol (HTTP) connections, etc. Further, any or all of the communication could be secure (e.g., secure shell (SSH), HTTPS, etc.).

The data tiering application 720, and/or its sub-components, such as, but not limited to, the interceptor 108, the searcher 110, the poller 104, the data mover 112, and/or the metadata handler 118 may include hardware and/or software logic executable by one or more computing devices 730. In some embodiments, the data tiering application 720, and/or one or more of its sub-components, may comprise sets of instructions executable by the processor(s) 702 to provide their functionality. In some embodiments, the data tiering application 720, and/or one or more of its sub-components, are stored in the non-transitory memor(ies) 704 of the system 700 and are accessible and executable by the processor(s) 702 to provide their functionality. In any of the foregoing implementations, the data tiering application 720, and/or one or more of its sub-components, may be adapted for cooperation and communication with the processor(s) 702 and other components of the system 700.

In further implementations, the data tiering application 720, and/or one or more of its sub-components, may include specially configured software stored in the memor(ies) 704 and executable by the processor(s) 702 so as to configure the processor(s) 702. In some embodiments, the data tiering application 720, and/or one or more of its sub-components, may include logic gates, switches, application-specific integrated circuitry (ASIC), a programmable logic controller, an embedded microcontroller, and/or other suitable hardware, etc. In further embodiments, data tiering application 720, and/or one or more of its sub-components, may include both hardware and software aspects. Numerous further variations are also possible and contemplated.

The data tiering application 720 may include various interfaces, such as software and/or hardware interfaces (e.g., application programming interface(s) (API(s)), that may be accessed (e.g., locally, remotely, etc.) by components of the system 700, such as various client applications, the third-party applications, etc. In some embodiments, the data tiering application 720 may be a distributed application that is implemented in two or more computing systems.

The interceptor 108 comprises software and/or hardware logic executable by the processor(s) 702 to receive requests from an application 106 in association with a file. The interceptor 108, in conjunction with the file system 102 and/or the searcher 110, can determine if the file has been archived in the data archive 760 or is available at the file system 102. In some embodiments, the interceptor 108 intercepts calls by applications 106 (e.g., user application operated on a user device, a local application, a remote software application or service, etc.), determines the states of the files associated with the calls, and triggers restoration of archived files if needed.

In some embodiments, the interceptor 108 may receive a request for a file (e.g., f2), and search for the file in the file system (e.g., using file system APIs). If not found in the file system 102, the interceptor 108 may route the file request to the searcher 110, which may search the key-value store 116 for the file. In some cases, responsive to the interceptor 108 routing the request to the searcher 110, the searcher 110 performs a near-real-time search in the key-value store 116 to retrieve the object path related to the compressed file containing the requested file. In further embodiments, responsive to receiving the request for the file, the interceptor 108 may query the key-value store 116 first for the file, and if not found, may then check the file system 102 for it.

Responsive to the file being found in the key-value store 116, the searcher 110 may inform the interceptor 108 of the file's presence in the data archive 760 in a data response to the interceptor 108 and/or the data mover 112. The interceptor 108 or the data mover 112 may then initiate restoration of the file, and its associated files. In some cases, the data mover 112 fetches the object (e.g., compressed file) from the object storage 114, restores the group of files back into the file system in an decompressed format (e.g., by extracting the object and storing the files in the file system 102), and signals (notifies) the interceptor that the files are available in the file system.

Advantageously, a group of related files including the requested file (e.g., f1, f2, f3) can be moved back to the file system 102 by the data mover 112 in a transparent manner, and then the call for the file from the application 106 may be satisfied (e.g., the file may be provided to the application 106). Additionally, as the group of files have now been restored, any subsequent calls from the application 106, which have a higher probability of affecting files (e.g., f1, f3) related to the previously requested file (e.g., f2), can more quickly be satisfied as a subsequent restoration operation will not be necessary to restore them from the data archive 760 before satisfying the subsequent calls. For instance, the application 106 has transparent, ready access to both the file and the files frequently accessed in association with the file.

The poller 104 comprises software and/or hardware logic executable by the processor(s) 702 to mine files (e.g., frequently accessed files that are now dormant) and group them prior to tiering. For instance, the poller 104 can poll for files in the file system 102 that are dormant (e.g., untouched, unmanipulated, etc.) for a specified time period. Upon identifying a given dormant file, the poller 104 can execute machine learning logic to predict a group or cluster of files that are closely associated frequently with the dormant file. This process can be performed for any number of dormant files such that a plurality of groups of associated files can be identified depending on the implementation. Beneficially, the data tiering application 720 can move the group of associated files from the file system 102 to the data archive 760 and retrieve the group of associated files from the data archive 760 and restore them at the file system 102 as needed, as described in further detail elsewhere herein.

In some embodiments, the machine learning logic may comprise an executable clustering algorithm that generates a pattern data structure and derives the group of files corresponding to the dormant file based on the tree. As used herein, a mapping data structure includes a data structure that models file patterns. The pattern data structure may, in some non-limiting examples, comprise a compact, tree-like structure, that relate files based on file access characteristics. In some embodiments, the tree-like structure may be hierarchically organized based on file access patterns. In a further non-limiting example, the clustering algorithm can extract frequent itemsets from the frequent-pattern tree based on a support constraint (e.g., where support>=minsup (minimum support threshold).

The machine learning logic may in some cases comprise a frequent-pattern (FP) growth (FP Growth or FPG) algorithm or other suitable clustering algorithm that can generate a model (e.g., compact tree) that can be efficiently processed (e.g., mined) to determine frequent file access patterns (e.g., which files are accessed in association with one another, such as under the same process, in the same timeframe, etc.). Using the file access patterns, the poller 104 can determine the cluster of associated files to be transferred (e.g., together in a single transfer). An FPG algorithm is an efficient machine learning algorithm for mining frequent itemsets. Advantageously, embodiments that use the FPG algorithm benefit from the generation of a compressed data structure (e.g., FP-tree) with an efficient computation of candidates (e.g., using a divide and conquer strategy that minimally scans the data source (e.g., twice)).

In some embodiments, the clustering algorithm can apply one or more association rules to optimize the results (e.g., apply minimum counts, confidence thresholds, etc.). The poller 104 can generate association rules from the frequent itemsets, based on certain conditions.

As used herein, an association rule refers to a rule that applies minimum threshold(s) to constraint(s), such as support and confidence constraints, to file access patterns in order to identify more relevant relationships in those patterns. A support constraint refers to how frequently the itemset appears in the dataset. A confidence constraint refers to an indication of how often the rule has been found to be true.

In some embodiments, the poller 104 can generate an association rule using the following operations: 1) apply a minimum support threshold to find all frequent itemsets in a dataset; and 2) apply a minimum confidence constraint to the frequent itemsets to generate acceptable rules. The poller 104 can further calculate and apply lift to avoid issues with high confidence rules that could provide misleading results.

To aid in understanding, the following additional definitions and non-limiting example embodiments for generating a cluster of associated files are provided.

X refers to an itemset, X=>Y refers to an association rule, and T refers to a set of transactions [t1, t2, etc.]. The support of X with respect to T is defined as the proportion of transactions t in the dataset which contains the itemset X, as reflected by the following equation:

$$supp(X) = \frac{|\{t \in T; X \subseteq t\}|}{|T|}$$

The confidence value of a rule, X=>Y, with respect to a set of transactions T, refers to the proportion of the transactions that contains X which also contains Y, as reflected by the following equation:

$$\operatorname{conf}(X \Rightarrow Y) = \operatorname{supp}(X \cup Y)/\operatorname{supp}(X)$$

The lift of a rule is defined as:

$$\operatorname{lift}(X \Rightarrow Y) = \frac{supp(X \cup Y)}{supp(X) \times supp(Y)} = \frac{conf(X \Rightarrow Y)}{supp(Y)}$$

or the ratio of the rule's confidence to the support of the itemset in the rule consequent. In some cases, if the lift is >1, that can indicate the degree to which those two occurrences are dependent on one another, and makes those rules potentially useful for predicting the consequent in future data sets.

The poller 104 can extract association rules from each of the frequent itemsets based on a confidence constraint, such as where conf (R)>=minconf (minimum confidence constraint), for example.

Figure 3:
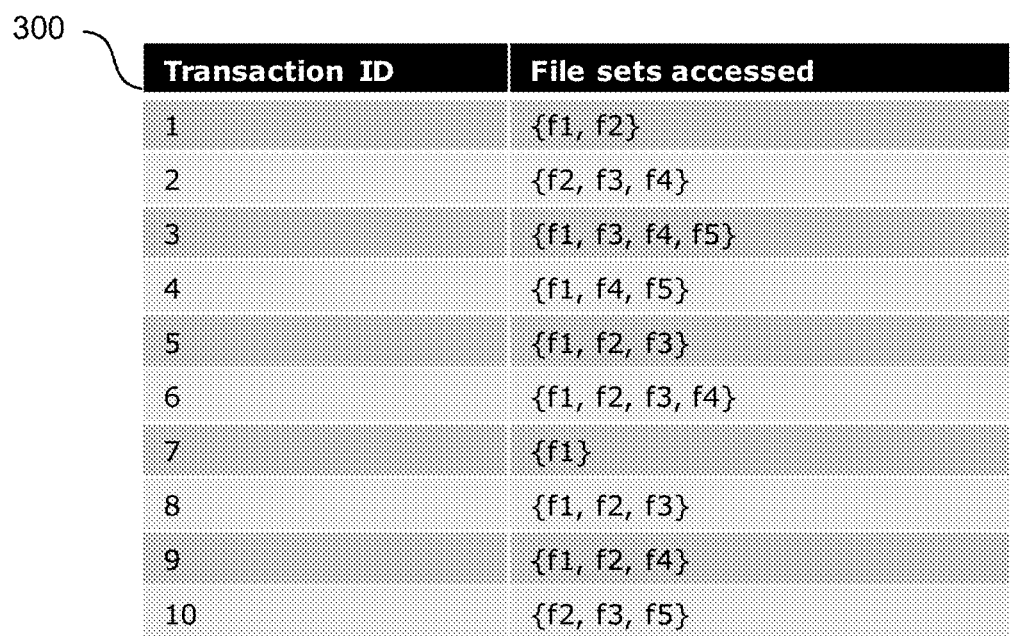
FIG. 3 illustrates a table of example file sets.

FIGS. 3-6 illustrate a further example of using an FPG algorithm for finding frequently accessed file sets. In particular, FIG. 3 illustrates a table 300 of example file sets, and FIG. 4A illustrates an example process 400 for building a pattern data structure based on the dataset included in table 300.

In particular, table 300 includes sets of files associated with different transactions, as reflected by their corresponding transaction identifiers (IDs). A transaction reflects an instance in which files were accessed in some way (e.g., modified, loaded, executed, written, read, etc.). An instance may be determined by a period of time (time interval) over which the files were accessed, a thread that accessed the files, an operation that accessed the files, a hardware component that generated or transmitted the file, or another suitable dimension. In some cases, an instance reflects a file access snapshot.

In some embodiments, the table may be sorted and/or filtered based on one or more criteria. For example, the files in the sets of files may be sorted in descending order of frequency and any files across the file sets that appear less than a minimum threshold (e.g., minsup of 2) may be removed.

The poller 104 may generate an initial FP tree (also referred to in some cases as a complete FP-tree) after reading the file sets data from the data source (e.g., table 300) as shown in block 402 of FIG. 4. For example, the poller 104 generates a first branch on the left side extending from null>f1>f2 for transaction 1, a second branch for transaction 2 on the right side extending from null>f2>f3>f4, a third branch for transaction 3 on the left side using f1 from the first branch and extending off of f1 to f3>f4>f5 and so forth. For each node, the value after the colon (:) reflects the number of times that file appears in that specific position in file sets. For example, f1 appears in the first position eight times in the file sets (for transactions 1, 3, 4, 5, 6, 7, 8, 9) and therefore the value at the f1 node is 8. f2 is somewhat different because it appears in two different ways in the file sets, in the first position in transactions 2 and 10, and in the second position in transactions 1, 5, 6, 8, and 9. As a result, the f2 node on the right side between null and f3 has a value of 2 (for f2 being in the first position in transactions 2 and 10), and the f2 node on the left side between f1 and f3 has a value of 5 (for f2 being in the second position in transactions 1, 5, 6, 8, and 9. The dashed lines are pointers that connect the nodes representing the same file in the different file set sequences, and assist in computing the total support or frequency of the file across the file set sequences. For example, the f2:5 node on the left is connected by a dashed line to the f2:2 node on the right to show the relation between f2's different positions in the file set sequences and assists in computing the total support or frequency of f2 to be 7.

Blocks 404 and 406 depict the generation of conditional FP trees by the poller 104. More particularly, the poller 104 generates frequent itemsets recursively from the FP tree using a bottom-up approach from leaves to the root, starting with the last item as positioned in the set of transactions. The size of the tree may depend on how the items are ordered. For instance, in block 404, the poller 104 extracts a prefix subtree ending in an item, such as f5 in this example.

In block 404, if the support count of the item (f5 in this example) is greater than or equal to a minimum threshold (e.g., minsup=2), the poller 104 proceeds to build a conditional FP tree for that item (f5 in this example), shown in block 406.

In block 406, the poller 104 re-computes the support count of each node in the prefix subtree (block 404), ending in the item (f5 in this example), the support count of a node being the sum of the support count of the leaves containing the item (f5 in this example) in its subtree. The poller 104 also prunes infrequent items (with support count less than the minimum threshold), and ultimately truncates the item (f5) from all transactions, although it should be understood that another file may be selected and builds conditional FP trees for that item, by considering only those transactions containing the item.

In block 406, the poller 104 can generate a conditional FP tree for the item (f5 in this case) by updating the support counts of f2 and f3 on the rightmost branch of the prefix subtree in block 404 to 1 (as they both lead to f5 only once through this branch), followed by updating the support count of f1 to 2 on the leftmost branch (as it leads to f5 twice through the leftmost and central branch). The poller 104 has also pruned the infrequent item f2, because the total re-computed support count of f2 is now less than the minimum threshold (e.g., minsup=2), but has retained f3 because its total support count after re-computation is 2 (equal to the minimum threshold) across the tree. The poller 104 also removes the item (f5) from all transactions to create the conditional FP tree for the item (f5 in this example).

Figure 4A:
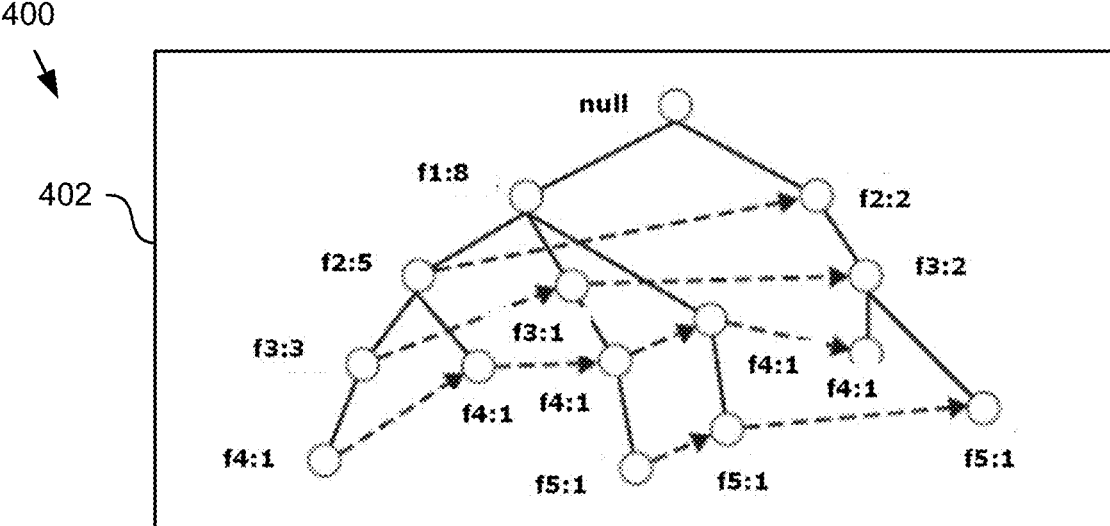
FIG. 4A illustrates an example process for building a pattern data structure.
Figure 4A:
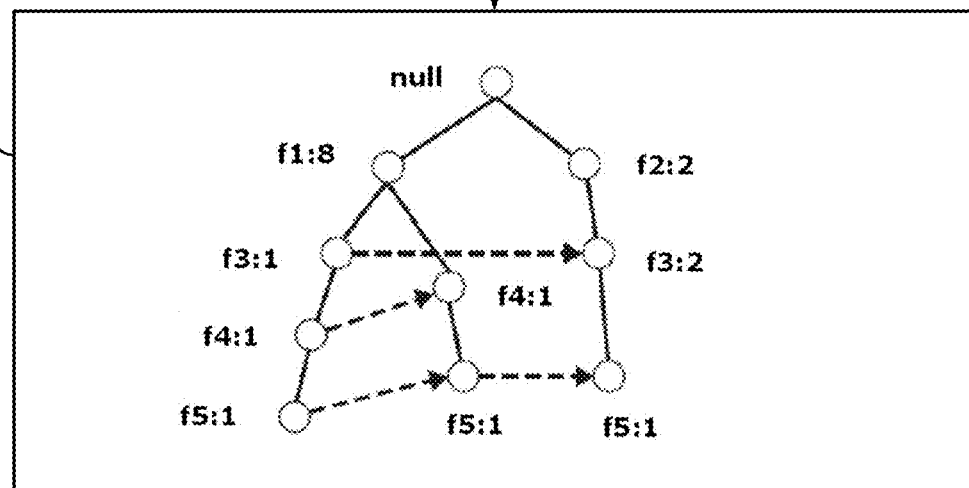
Figure 4A:
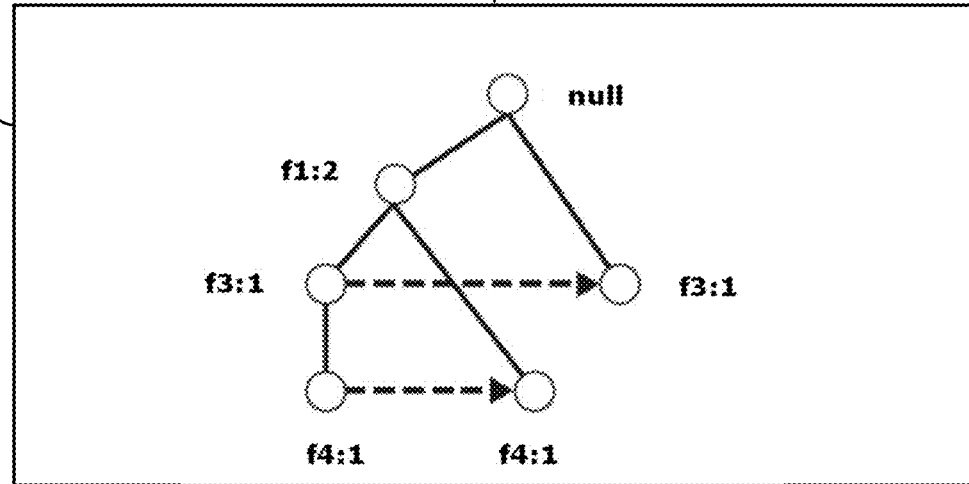
Figure 4B:
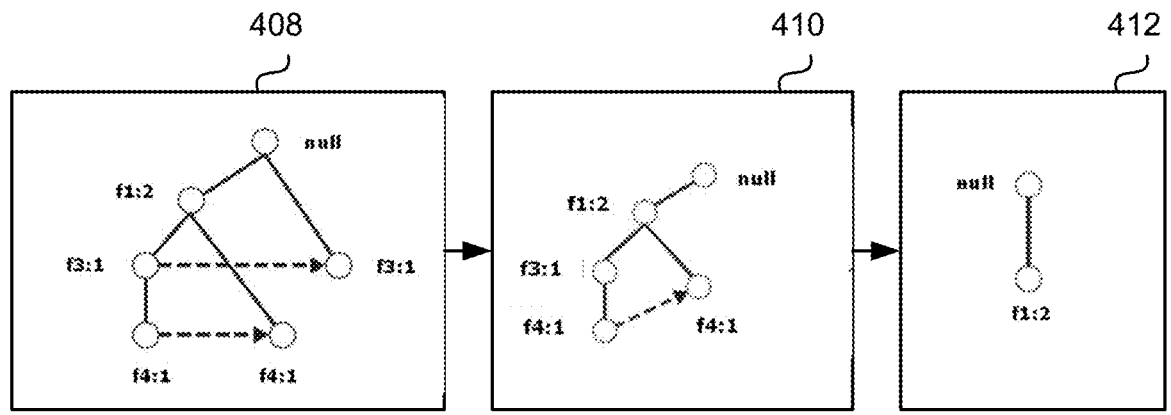
FIGS. 4B-4D illustrate an example recursive extraction of conditional structures.
Figure 4C:
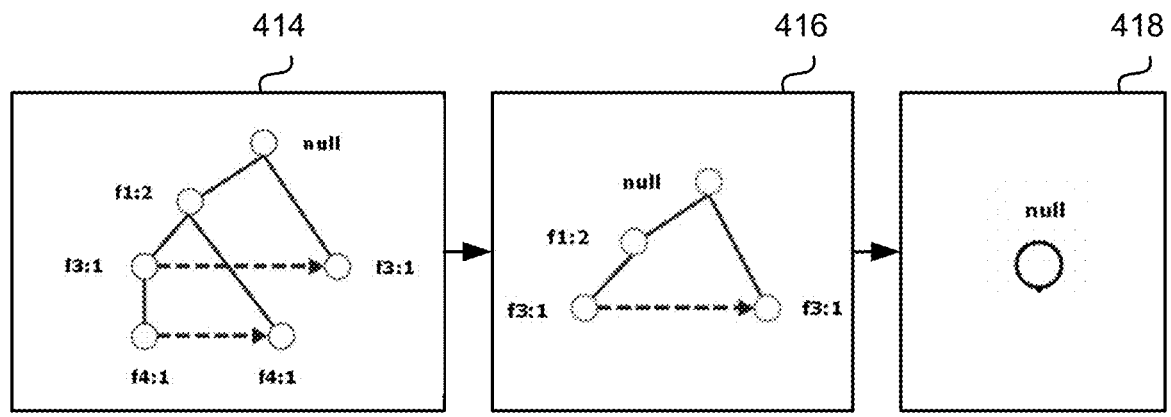
Figure 4D:
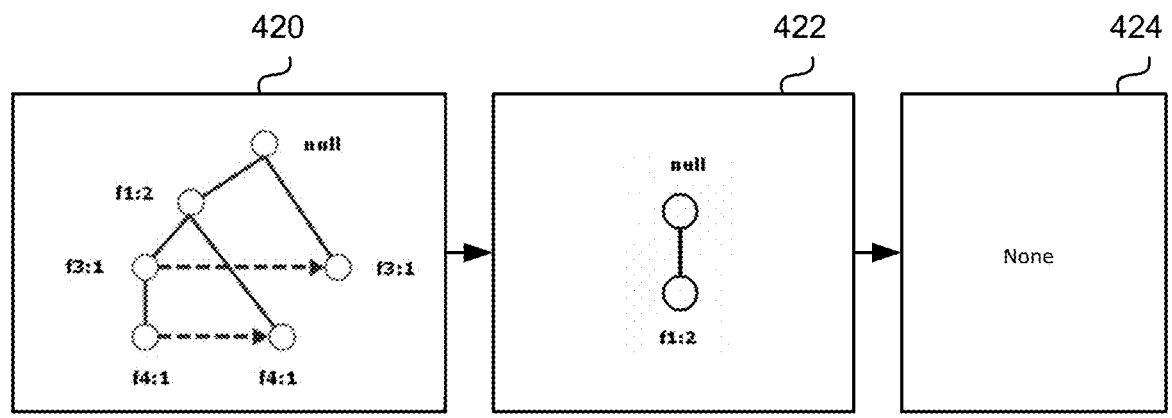

The poller may then recursively extract frequent itemsets ending in f4 f5, f3 f5, f2 f5, and f1 f5, and then apply the same to itemsets ending in f1 f4 f5, f2 f4 f5, f3 f4 f5, and so on. The poller 104 may then repeat the same for f4, f3, f2, f1. For example, FIGS. 4B-4D illustrate the example extraction of frequent itemsets ending in f4 f5, f3 f5, and f1 f5 using a minsup=2. In this example, f2 f5 is not considered because f2 is not in the conditional FP tree for f5.

In particular, in block 408, the poller 104 starts with the conditional FP tree for f5, as determined in block 406. Then, in block 410, the poller 104 determines a prefix subtree ending in f4 f5, and in block 412, the poller 104 determines a conditional FP tree for f4 f5.

In block 414, the poller 104 starts with the conditional FP-tree for f5, as determined in block 406. Then in block 416, the poller 104 determines a prefix subtree ending in f3 f5, and in block 418, the poller 104 determines a conditional FP-tree for f3 f5.

In block 420, the poller 104 starts with the conditional FP tree for f5, as determined in block 406. Then in block 422, the poller 104 determines a prefix subtree ending in f1 f5, and in block 424, the poller 104 determines that there is no conditional FP tree for the frequent itemset f1 f5. In this example, an update to the support count is not needed, and pruning is also not needed.

FIG. 5 illustrates a table 500 of example frequent files sets. As shown, various file sets may be determined and/or further processed based on one or more target files, such as those in the "Ending with" column.

FIG. 6 illustrates a table 600 of the example frequent files sets in table 500, now sorted by support count. The support counts from the complete FP tree and prefix subtrees may be used by the poller 104 to calculate the confidence of association rules of the frequent file sets shown in FIG. 5 (e.g., using minsup=2 in this example). In some embodiments, the poller 104 may generate association rules from the frequent file sets by determining the non-empty subset combinations for each of the frequent file sets and calculate a confidence score for each of the rules for these frequent file sets (e.g., using the non-limiting formula presented above) to determine whether the corresponding association rule should be accepted. In some embodiments, a percentage confidence threshold (minconf) can be used for this purpose.

For example, for {f1, f2, f3}, the poller 104 may determine that the all non-empty subsets are {f1, f2}, {f1, f3}, {f2, f3}, {f1}, {f2}, {f3}, and determine the following (support count is abbreviated as sc in the example):

For Rule R1: f1 ^f2→f3, determine that the confidence=sc{f1, f2, f3}/sc {f1, f2}=3/5=60%. The poller 104 may reject the rule based on the confidence being less than the confidence threshold (e.g., minconf=70%).

For Rule R2: f1 ^f3→f2, determine that the confidence=sc{f1, f2, f3}/sc {f1, f3}=3/4=75%. The poller 104 may accept the rule based on the confidence being less than the confidence threshold (e.g., minconf=70%).

For Rule R4: f1→f2^f3, determine that the confidence=sc{f1, f2, f3}/sc{f2, f3}=3/5=60%. The poller 104 may reject the rule based on the confidence being less than the confidence threshold (e.g., minconf=70%).

For Rule R3: f2^f3→f1, determine that the confidence=sc{f1, f2, f3}/sc=3/8=37%. The poller 104 may reject the rule based on the confidence being less than the confidence threshold (e.g., minconf=70%).

For Rule R5: f2→f1 ^f3, determine that the confidence=sc{f1, f2, f3}/sc{f2}=3/7=42%. The poller 104 may reject the rule based on the confidence being less than the confidence threshold (e.g., minconf=70%).

For Rule R6: f3→f1 ^f2, determine that the confidence=sc{f1, f2, f3}/sc{f3}=3/6=50%. The poller 104 may reject the rule based on the confidence being less than the confidence threshold (e.g., minconf=70%).

Further for Rules R7 through R24, the poller 104 may further calculate the confidence for each of the rules for the frequent itemsets, determine that the generated rules R7 through R24 in the next three cases have confidence less than a minimum threshold (e.g., less than minconf=70%), determine that those rules are unacceptable as a result. For example, the poller 104 may take {f1, f2, f4}, which has all non-empty subsets as {f1, f2}, {f1, f4}, {f2, f4}, {f1}, {f2}, {f4}, and {f2, f3, f4}, which has all non-empty subsets as {f2, f3}, {f2, f4}, {f3, f4}, {f2}, {f3}, {f4}, and {f1, f3, f4}, which has all non-empty subsets as {f1, f3}, {f1, f4}, {f3, f4}, {f1}, {f3}, {f4}, and calculate the confidence for each of the rules for these frequent itemsets in a manner similar to Rules 1-6. In this example, the poller 104 determines that the generated rules R7 through R24 in the above three cases have confidence <70%, and hence no rule is acceptable.

Further, the poller 104 may take {f1, f4, f5} which has all non-empty subsets as {f1, f4}, {f1, f5}, {f4, f5}, {f4}, {f5}, and determine that two rules: R26: f1 ^f5→f4 and R27: f4^f5→f1 both have confidence of 100%. The poller 104 may thus accept those association rules. The poller 104 may reject any other rules that do not satisfy the confidence threshold (e.g., rules with confidence <70%).

For the above example, the accepted rules are determined to be:

| | |
|---|---|
| *f1* ^*f3*→*f2*; | R2 |
| *f1* ^*f5*→*f4*; and | R26 |
| *f4* ^*f5*→*f1* | R27 | where, R26 and R27 are the strongest association rules, with 100% confidence. In this case, the tiering application 720, while tiering a dormant file (e.g., f1) can also tier its associated dormant files (f4 and f5). As a result, a request for either one of the three files can result in the restoration of all three files from the data archive 760 to the file system 102. Further, the poller 104 can apply the association rules it learns to further train and enhance the model over time.

The data mover 112 comprises software and/or hardware logic executable by the processor(s) 702 to compress and transparently move the group or cluster of files determined by the poller 104. For example, dormant file(s) along with their closely-associated files (e.g., f1, f2, f3) can be moved by the data mover 112 to the object storage 114. In some cases, the group of files can advantageously be moved in a single transfer. The data mover 112 may instruct the metadata handler 118 to record and store file-related data describing the files of the group in the key-value store 116. Examples of the file-related data include the object paths, the original file paths (in the file system), the hostnames, file metadata, timestamps, and/or any other suitable information. In some embodiments, the file-related data may be recorded, and stored in the key-value store 116 via the metadata handler 118 in a key-value format, although other suitable variations are also possible and contemplated. In some embodiments, the data mover 112 and/or metadata handler 118 may interact with the key-value store 116 using an application programming interface to index the file-related data being stored. In further embodiments, the key-value store 116 may automatically index the file-related data being stored responsive to receiving the file-related data. Other variations are also possible.

The data mover 112, using the file cluster information defining the file cluster determined by the poller 104, stores the file cluster in the object storage 114. In some embodiments, the file cluster may be compressed by the data mover 112 and stored in a compressed format in the object storage 114. For example, the data mover 112 may extract and compress the generated cluster of files from the files system 102 or the poller 104 (e.g., generates f.gz that preserves the directory structure of the files in the file system 102 (e.g., /data1/f1, /data2/f2, /data3/f3, etc.). Further, the data mover 112 may move the compressed file (e.g., f.gz) to the object storage 114. In the object storage 114, the compressed file may have an object path (e.g., s3://mybucket/hostname/f.gz).

Responsive to storing the file in the object storage 114 and the corresponding metadata stored and indexed in the key-value store 116, the data mover 112 may delete the files (e.g., f1, f2, f3) from one or more storage devices, such as the file system, one or more, any, all, etc., any temporary storage devices used for processing (e.g., compression) prior to storing in the object storage, etc.

The metadata handler 118 comprises software and/or hardware logic executable by the processor(s) 702 to handle metadata for the objects stored in, manipulated in, and retrieved from the object storage 114. The metadata handler 118 may be coupled to the key-value store 116 to store, update, and/or delete metadata and related index(es) in the key-value store 116.

In some embodiments, after a successful write commit to the object storage 114 by the data mover 112, the metadata handler 118 may store entries in the key-value store 116 reflecting the file-related information. For example, the metadata handler 118 may record the object paths as keys (s3://mybucket/hostname/f.gz) and original file paths (/data1/f1, /data2/f2, /data3/f3, etc.), hostnames, and other suitable information, as values. In some embodiments, the metadata handler 118, in conjunction with the key-value store 116, may build the key-value pairs in the suitable key-value store 116 format (e.g., JavaScript object notation (JSON)) and stores the key-value pairs in the key-value store 116.

In some embodiments, the original file paths may be defined by the cluster/group of associated files, may be defined by the compressed object (e.g., tar.gz, zip, etc., file), file hierarchy and/or path data accompanying the cluster/group of associated files, etc., and may be processed by the metadata handler 118.

In some embodiments, the metadata handler 118 in coordination with the data mover 112 may trigger an update to the key-value store 116 for the entries related to the file being restored (e.g., f.gz, f1, f2, f3, etc.) in association with the deletion of the file(s)/object(s) from the object storage 114. For example, the key-value store 116's index may be updated to remove the key-value pairs and/or update the key-value pairs to reflect the file(s) were deleted from the object storage 114.

The searcher 110 comprises software and/or hardware logic executable by the processor(s) 702 to search the key-value store index for metadata related to one or more objects stored in the object storage 114. In some embodiments, the searcher may, in cooperation with the interceptor 108, search the key-value store responsive to receiving a trigger from the interceptor, retrieve the file-related information, and provide it to the data mover 112. For example, if the search for a file (e.g., f2) is triggered by the interceptor 108, the searcher 110 may retrieve the object path for the file (e.g., s3://mybucket/hostname/f.gz) and send the path to the Data Mover for further processing, although it should be understood that any file-related information (e.g., such as that processed by the metadata handler 118) may be used to search and/or may be retrieved.

In FIGS. 1A and 1B, example data flows and interactions between the file system 102, the poller 104, the application(s) 106, interceptor 108, the searcher 110, the data mover 112, the object storage 114, the key-value store 116, and the metadata handler 118 are shown.

In FIG. 1A in particular, the process for archiving a group of files is depicted. In operation O1, the poller 104 periodically polls for files in the file system that satisfy one or more archival criteria. The one or more archival criteria may reflect that the files have become dormant. Responsive to identifying one or more files that need archiving, the poller 104 determines, for each file to be archived, a set of related files that should be archived together with that file, as discussed elsewhere herein. The file and the related files form a group of associated files that are to be archived.

In operation O2, the data mover 112 prepares the group of associated files for storage in the object storage 114 and then, in operation O3, moves the group of associated files to the object storage 114. As discussed elsewhere herein, in some embodiments, the group of associated files is compressed into a compressed object and the compressed object is stored in the object storage 114.

In operation O4, the data mover 112 signals the metadata handler 118 to store metadata associated with the group of files in the key-value store 116. Responsive to the object(s) being stored in the object storage 114, the metadata handler 118, in operation O5, updates the key-value store 116 with the file-related information for the object(s), such as but not limited to, storing the object paths as keys (e.g., s3://mybucket/hostname/f.gz) and storing the original file paths (e.g., /data1/f1, /data2/f2, /data3/f3, etc.), hostnames, etc. (e.g., file attributes, user id, information related to the request, performance, etc.), as values. This advantageously allows for the tracking of the original file paths, hostnames, and object paths so that the files may be restored back to their original locations.

In operation O6, the key-value store 116 indexes the values so the files are searchable based on any suitable attributes including file system attributes, such as the file system filenames, the file system file paths, etc.

In operation O7, the Data Mover 112, responsive to receiving confirmation that the group of associated files was successfully archived (e.g., metadata related to the group of associated files was successfully indexed in the key-value store, etc.), deletes the files comprising the group, such as from the file system 102 and/or one or more other storage devices, such as temporary storage that were used during the process of archiving the file(s) in the object storage 114.

Referring now to FIG. 1B, the process for restoring the group of files is depicted. In operation O8, the interceptor 108 receives a request for a file. The request may comprise a file access or manipulation operation (e.g., touch, read, update, write, delete, etc.) received from an application 106 in some embodiments. In operation O9, the interceptor 108 may query for the file in the file system 102, and if it is not found, may, in operation O10, signal the searcher 110 to search for the file in the key-value store 116. In operation O11, the searcher may search the key-value store 116 for the file, and in response, receive the file-related information stored in the key-value store 116. For example, the searcher 110 may receive the object path, directory structure information, hostname, etc., related to the file.

In some embodiments, if the interceptor 108 receives a request for a file and, upon querying the file system 102 and/or the key-value store 116 (e.g., via the searcher 110) for the file, is unable to find the file either in the file system 102 or in the key-value store 116, then the interceptor 108 may determine that the file is in the process of being archived by the system 100 (e.g., the data mover 112). Responsively, the interceptor 108 may interrupt the archival process by requesting that the data mover 112 restore the file to the file system 102. In response, the data mover 112 may then remove the file from the cluster of associated files and restore the file to the file system 102 (e.g., at the original path) and inform the interceptor 108 that the file is now available.

In operation O12, the searcher 110 may provide the file-related information to the data mover 112, and the data mover 112, in operation O13, may use the file-related information to retrieve a file from the object storage 114. For example, the file-related information may include the object path and the data mover 112 may use the object path to retrieve the object including the file and its related files from the object storage. In the embodiment where these files are compressed into an object, the object storage 114 may return the compressed object and the data mover 112 may decompress the object (unzips the file f.gz to produce a list of files with their directory structure/data1/f1, /data2/f2, /data3/f3) so the files contained by it may be moved to the file system 102.

Advantageously, the compressed object may inherently preserve the relative file paths (original file paths) of the file(s) compressed by it, and that file structure may be used to restore the files at their original locations. In other cases, the files may be stored in an object or objects that include file path metadata reflecting their original or prior storage locations in the file system 102 or that data may be stored as metadata in the key-value store 116 and retrieved to determine the original paths of the files upon restoration. Other variations are also possible and contemplated.

In operation O14, the data mover 112, responsive to receiving the file(s)/object(s) from the object storage 114 and/or preparing the associated files to be restored to the file system 102, moves the files to the file system 102. Advantageously, the data mover 112 may store the files in their original locations so the files may be transparently accessed.

In operation O15, the data mover 112, responsive to restoration of the files in the file system 102, deletes the object including the files from the object storage 114.

In operation O16, the data mover 112 may trigger the metadata handler 118 to update the key-value store 116 in operation O17 to reflect the deletion of the file(s)/object(s) from the object storage.

In operation O18, the data mover 112 signals the interceptor 108 that the files have been restored to the file system 102. In some cases, the data mover 112 may provide the files directly to the interceptor 108 or the interceptor may retrieve them from the file system 102 when responding to the request from the application in operation O19. Accordingly, in operation O19, the interceptor 108 may provide the file and/or the files closely associated with the file to the application 106.

Figure 2A:
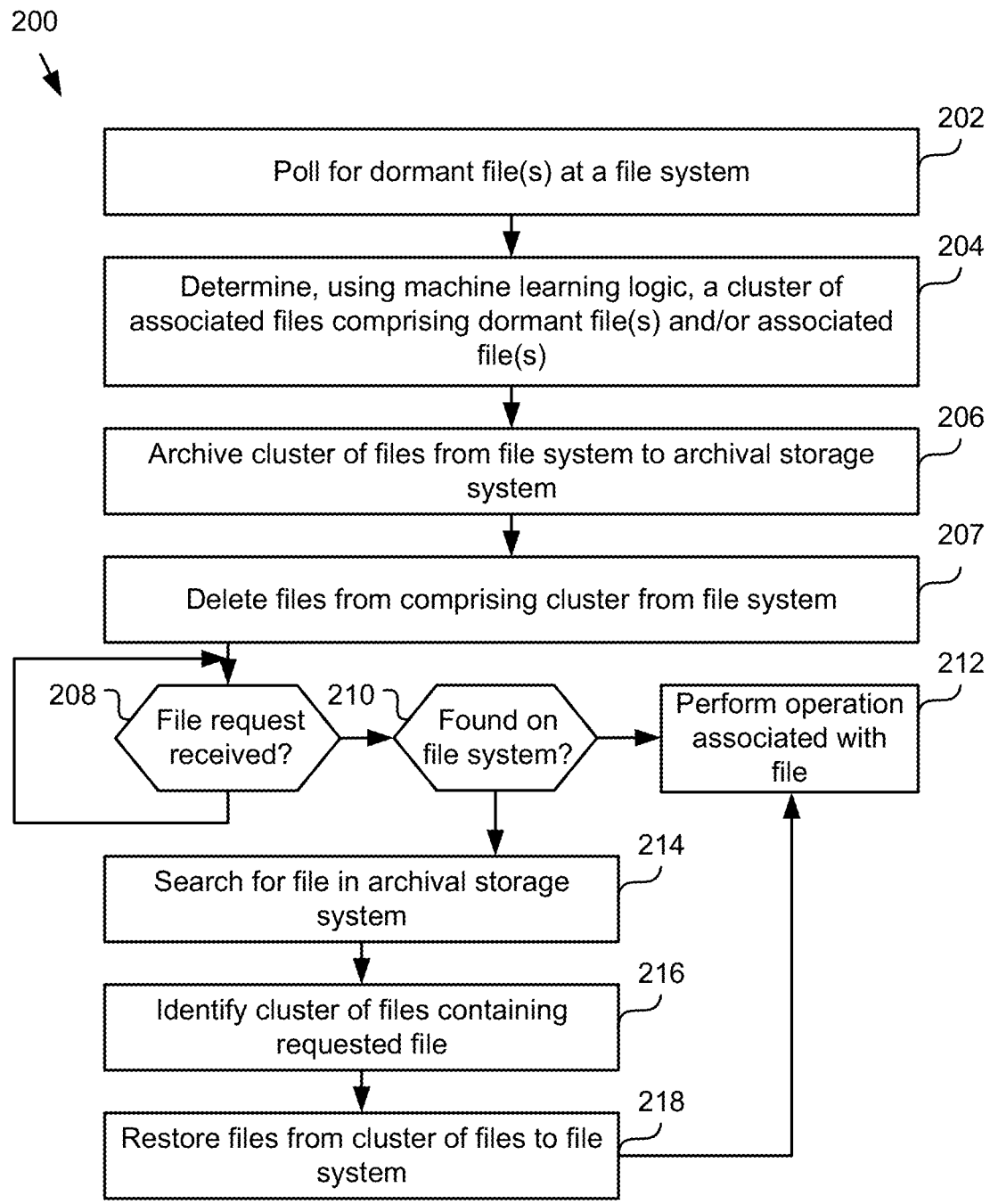
FIG. 2A illustrates an example method for intelligently archiving data to and retrieving data from an archival data storage system.

FIG. 2A illustrates an example method 200 for intelligently archiving data to and retrieving data from an archival data storage system. In block 202, the data tiering application 720 may poll for one or more dormant files stored in a file system of a computing device and determine, in block 204 using machine learning logic, a cluster of associated files including the one or more dormant files. In block 206, the data tiering application 720 may move the cluster of associated files from the file system to an archival object storage system (e.g., the data archive 760) coupled to the file system 102 via a computer network, and delete the associated files comprising the cluster of associated files from the file system in block 207.

In block 208, the data tiering application 720 may receive a request for an archived file at the computing device and identify the cluster of associated files containing the requested archived file in the archival object storage system. For instance, in block 210, the data tiering application 720 may determine whether the file is located in the file system 102. If not, the data tiering application 720 may search for the location of the file in the archival storage system in block 214, and based on the search, identify the cluster of files containing the requested file in block 216. Responsive to identifying the cluster of files, the data tiering application 720 may restore the files (including the requested archived file) to the file system 102 in block 218, in which case the requested archived file would now be restored to the file system 102.

In block 212, if the requested file is already located in the file system 102, or responsive to the file being restored to the file system, the data tiering application 720 may perform an operation associated with the restored file system file. For example, the data tiering application 720 may provide the file and/or the other files restored with it to the requesting application 106, process the file and/or other files in a manner specified by the application 106, etc.

Figure 2B:
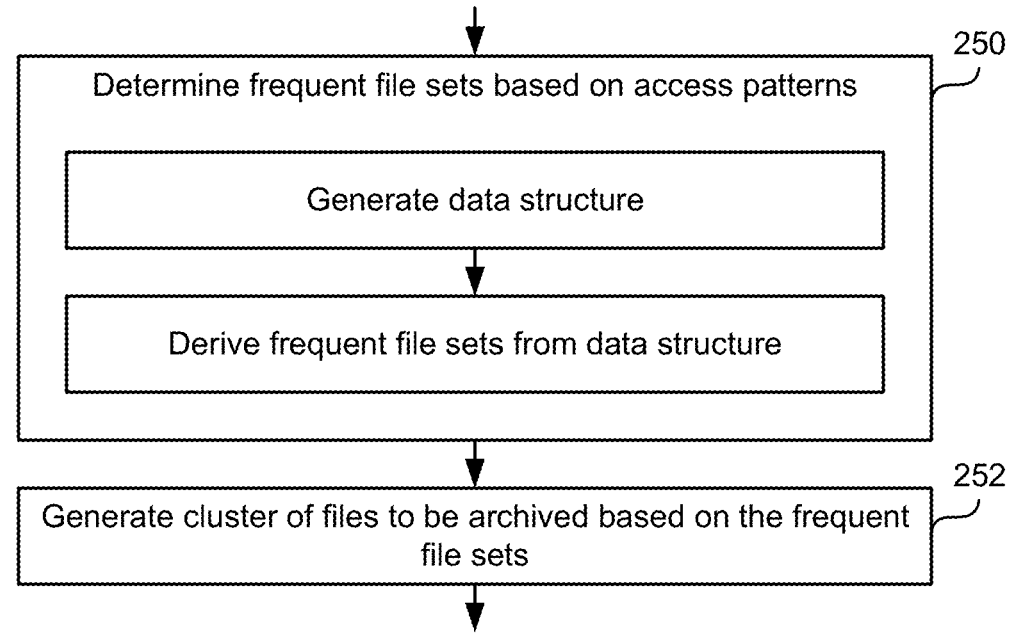
FIG. 2B illustrates an example method for determining a cluster of files to archive from a file system to an archival data storage system.

FIG. 2B illustrates an example method 204 for determining a cluster of files to archive from a file system to an archival data storage system, such as the data archive 760. In block 250, the data tiering application 720 determines, using machine learning logic, the cluster of associated files including the one or more dormant files. In some embodiments, this may comprise determining a plurality of frequent file sets based on access patterns. By way of further example, the data tiering application 720 may generate a generating a pattern data structure embodying a frequent-pattern tree and derive the frequent file sets from the frequent-pattern tree. In block 252, the data tiering application 720 may generate the cluster of files to be archived based on the frequent file sets.

Figure 2C:
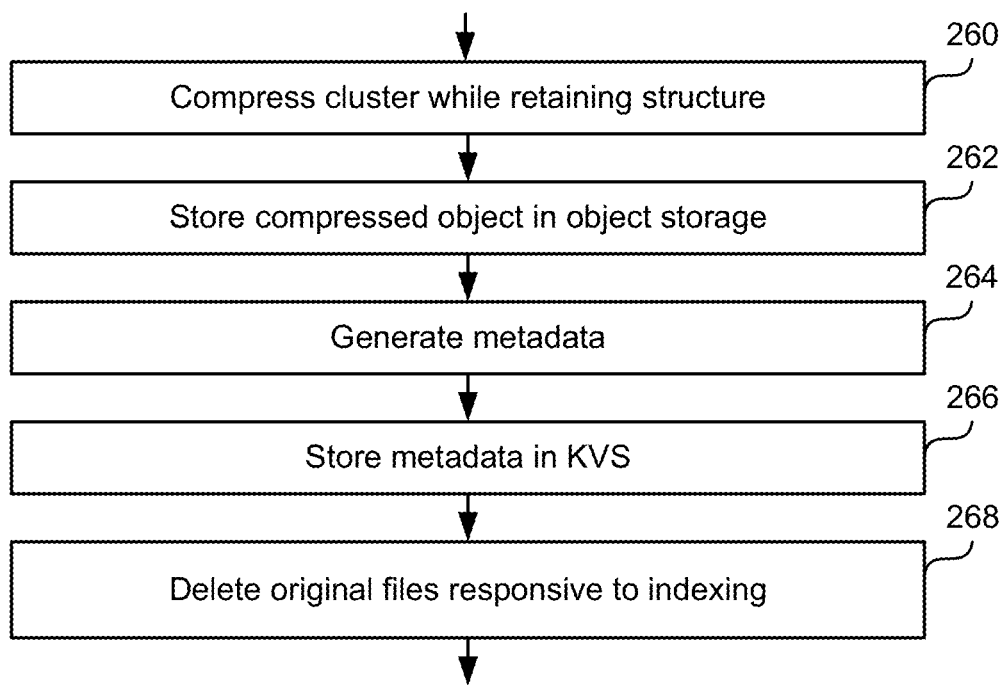
FIG. 2C illustrates an example method for archiving the cluster of files in the archival data storage system.

FIG. 2C illustrates an example method 206 for archiving the cluster of files in the archival data storage system.

In block 260, the data tiering application 720 may compress the cluster of associated files into a compressed object, while advantageously preserving the original file structure. In block 262, the data tiering application 720 may store the compressed object in object storage 114. In block 264, the data tiering application 720 may generate metadata for the associated files. For example, the data tiering application 720 may generate metadata for storage as key-value pairs (e.g., the compressed object path as the key and the associated file-related information (e.g., file paths, hostname, etc.) as values). In block 266, the data tiering application 720 may store the metadata in the key-value store (KVS) 116 for searching. For example, the data tiering application 720 may store the metadata as key-value pairs in a key-value store, which can then index the values for ease of search. In block 268, the data tiering application 720 may delete the original files. For example, the associated files comprising the cluster of associated files, such as those that were temporarily being prepared and processed prior to storing in the object storage 114, may be deleted from the file system 102 and/or other locations responsive to indexing the metadata for searching.

Figure 2D:
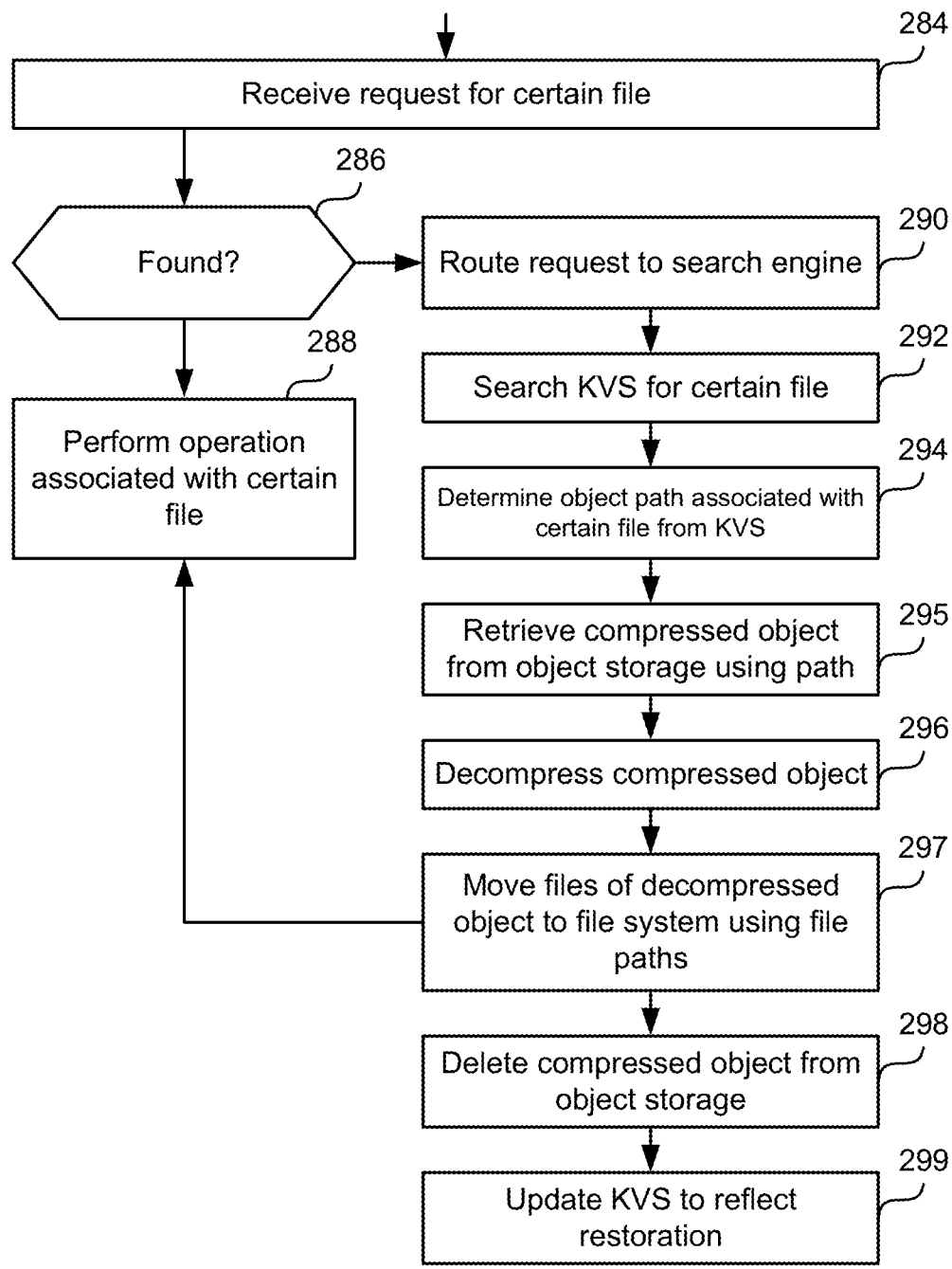
FIG. 2D illustrates an example method for restoring the cluster of files to the file system from the archival data storage system.

FIG. 2D illustrates an example method 280 for restoring a cluster of files to the file system from the archival data storage system. In block 284, the data tiering application 720 may receive a request for an archived file, and in block 286, may search the file system 102 and/or the index of the key-value store for the archived file. If not found, the data tiering application 720 may route the request to a search engine (e.g., searcher 110) in block 290, which may search the key-value store 116 in block 292 for the file in block 292. Responsive to locating the path of the compressed object containing the archived file from using a corresponding key-value pair stored in the key-value store 116, the data tiering application 720 may, in block 294, determine the file path of the compressed object stored in the object storage 114 using the path, retrieve the compressed object from object storage 114 in block 295 using the path, and proceed to restore the archived file and its associated files from the compressed object to the file system. In particular, the data tiering application 720 may retrieve the compressed object from the object storage as shown in block 295, decompress the associated files from the compressed object in block 296, and restore the associated files in the file system at the file paths in block 297 (e.g., by moving them based to their original paths or to corresponding paths). In block 298, the data tiering application 720 may delete the compressed object(s)/file(s) from object storage 114. In block 299, the data tiering application 720 may then update the key-value store 116 to reflect the restoration of the files and/or deletion of the compressed object(s)/file(s) from the object storage 114. If the file is originally found in the file system or restored using the above-noted method operations, the data tiering application may then perform operations in association with the certain file and/or its related files as shown in block 288.

Figure 2E:
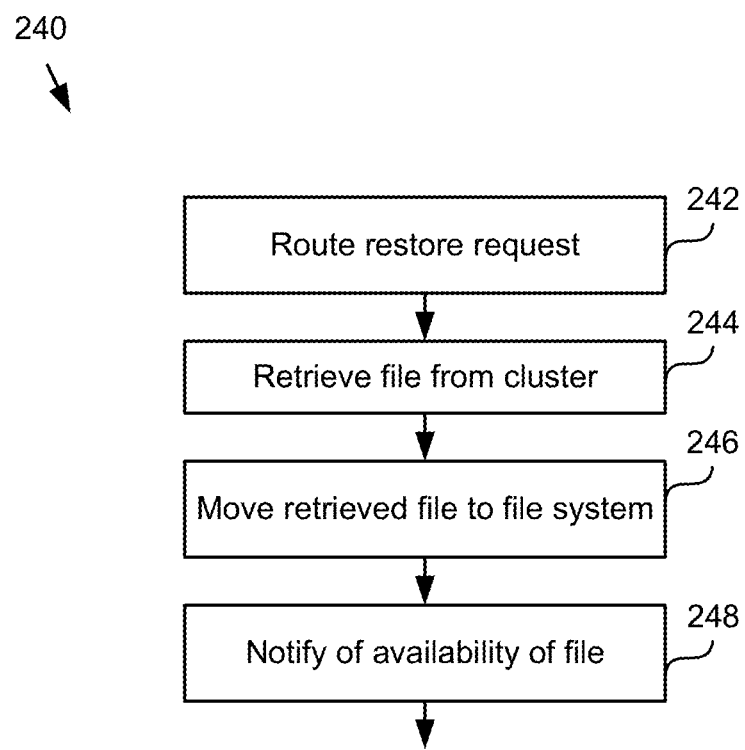
FIG. 2E illustrates an example method for restoring a requested file that is in the process of being archived.

FIG. 2E illustrates an example method 240 for restoring a requested file that is in the process of being archived. This method 240, in some cases, may be triggered when the file is not found in the file system or the KVS (e.g., in blocks 286 and 292 of the method 280, respectively).

In block 242, the method 240 may route a restore request to data mover 112, and in response, the data mover 112 in block 244 may retrieve the requested file from the cluster of associated files being processed by data mover 112. Upon retrieval, in block 246, the data mover 112 may move the retrieved file from the cluster to the file system 102 at its original file path (which may be determined from its relative location in the cluster (which may emulate a file tree structure) or from hierarchy metadata accompanying the cluster and handled by the data mover 112 and/or other components of the system 100). In block 248, the data mover 112 may notify the interceptor 108, the application 106, or other components of the availability of the requested file in file system 102.

While at least one exemplary embodiment has been presented in the foregoing detailed description of the technology, it should be appreciated that a vast number of variations may exist. It should also be appreciated that an exemplary embodiment or exemplary embodiments are examples, and are not intended to limit the scope, applicability, or configuration of the technology in any way. Rather, the foregoing detailed description will provide those skilled in the art with a convenient road map for implementing an exemplary embodiment of the technology, it being understood that various modifications may be made in a function and/or arrangement of elements described in an exemplary embodiment without departing from the scope of the technology, as set forth in the appended claims and their legal equivalents.

As will be appreciated, various aspects of the present technology may be embodied as a system, method, apparatus, or computer program product. Accordingly, some aspects of the present technology may take the form of a hardware embodiment, a software embodiment (including firmware, resident software, micro-code, etc.), or a combination of hardware and software aspects that may all generally be referred to herein as a circuit, module, system, and/or network. Furthermore, various aspects of the present technology may take the form of a computer program product embodied in one or more computer-readable mediums including computer-readable program code embodied thereon.

Any combination of one or more computer-readable mediums may be utilized. A computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, etc., or any suitable combination of the foregoing. Non-limiting examples of a physical computer-readable storage medium may include, but are not limited to, an electrical connection including one or more wires, a portable computer diskette, a hard disk, random access memory (RAM), read-only memory (ROM), an erasable programmable read-only memory (EPROM), an electrically erasable programmable read-only memory (EEPROM), a Flash memory, an optical fiber, a compact disk read-only memory (CD-ROM), an optical processor, a magnetic processor, etc., or any suitable combination of the foregoing. In the context of this document, a computer-readable storage medium may be any tangible medium that can contain or store a program or data for use by or in connection with an instruction execution system, apparatus, and/or device.

Computer code embodied on a computer-readable medium may be transmitted using any appropriate medium, including but not limited to, wireless, wired, optical fiber cable, radio frequency (RF), etc., or any suitable combination of the foregoing. Computer code for carrying out operations for aspects of the present technology may be written in any static language, such as the C programming language or another similar programming language. The computer code may execute entirely on a user's computing device, partly on a user's computing device, as a stand-alone software package, partly on a user's computing device and partly on a remote computing device, or entirely on the remote computing device or a server. In the latter scenario, a remote computing device may be connected to a user's computing device through any type of network, or communication system, including, but not limited to, a local area network (LAN) or a wide area network (WAN), Converged Network, or the connection may be made to an external computer (e.g. through the Internet using an Internet Service Provider).

Various aspects of the present technology may be described above with reference to flowchart illustrations and/or block diagrams of methods, apparatus, systems, and computer program products. It will be understood that each block of a flowchart illustration and/or a block diagram, and combinations of blocks in a flowchart illustration and/or block diagram, can be implemented by computer program instructions. These computer program instructions may be provided to a processing device (processor) of a general-purpose computer, special purpose computer, or other programmable data processing apparatus to produce a machine, such that the instructions, which can execute via the processing device or other programmable data processing apparatus, create means for implementing the operations/acts specified in a flowchart and/or block(s) of a block diagram.

Some computer program instructions may also be stored in a computer-readable medium that can direct a computer, other programmable data processing apparatus, or other device(s) to operate in a particular manner, such that the instructions stored in a computer-readable medium to produce an article of manufacture including instructions that implement the operation/act specified in a flowchart and/or block(s) of a block diagram. Some computer program instructions may also be loaded onto a computing device, other programmable data processing apparatus, or other device(s) to cause a series of operational steps to be performed on the computing device, other programmable apparatus or other device(s) to produce a computer-implemented process such that the instructions executed by the computer or other programmable apparatus provide one or more processes for implementing the operation(s)/act(s) specified in a flowchart and/or block(s) of a block diagram.

A flowchart and/or block diagram in the above figures may illustrate an architecture, functionality, and/or operation of possible implementations of apparatus, systems, methods, and/or computer program products according to various aspects of the present technology. In this regard, a block in a flowchart or block diagram may represent a module, segment, or portion of code, which may comprise one or more executable instructions for implementing one or more specified logical functions. It should also be noted that, in some alternative aspects, some functions noted in a block may occur out of an order noted in the figures. For example, two blocks shown in succession may, in fact, be executed substantially concurrently, or blocks may at times be executed in reverse order, depending upon the operations involved. It will also be noted that a block of a block diagram and/or flowchart illustration or a combination of blocks in a block diagram and/or flowchart illustration, can be implemented by special purpose hardware-based systems that may perform one or more specified operations or acts, or combinations of special purpose hardware and computer instructions.

While one or more aspects of the present technology have been illustrated and discussed in detail, one of ordinary skill in the art will appreciate that modifications and/or adaptations to the various aspects may be made without departing from the scope of the present technology, as set forth in the following claims.

What is claimed is:

1. A data storage system comprising:
one or more computing devices;
a file system;
an object storage system, configured to be coupled for electronic communication to the file system via a computer network, comprising an object storage; and
a data tiering application executable by the one or more computing devices to perform operations comprising:
determining a plurality of file sets and corresponding transactions targeting the plurality of file sets;
determining, using machine learning logic, a pattern data structure of relationships among files in the plurality of file sets and transactions targeting each file;
determining, based on the pattern data structure, a cluster of associated files stored in the file system; and
archiving the cluster of associated files from the file system to the object storage.

2. The data storage system of claim 1, wherein the operations further comprise:
receiving a request for an archived file;
identifying, in the object storage, the cluster of associated files containing the requested archived file;
restoring the cluster of associated files including the requested archived file to the file system, the requested archived file now comprising a restored file system file; and
performing an operation associated with the restored file system file.

3. The data storage system of claim 2, wherein the operations further comprise:
notifying about an availability of the restored file system file.

4. The data storage system of claim 1, wherein:
the operations further comprise filtering the plurality of file sets to determine a plurality of frequent file sets based on access frequency; and
the machine learning logic is configured to generate the cluster of associated files based on the frequent file sets.

5. The data storage system of claim 1, wherein determining the cluster of associated files in the file system comprises:
determining, based on the pattern data structure, support counts for the plurality of file sets;
determining, based on the support counts, a confidence score for each association rule of a plurality of association rules for the plurality of file sets;
selecting, based on confidence scores for the plurality of association rules, accepted rules for the plurality of file sets; and
applying the accepted rules for the plurality of file sets to determine the cluster of associated files in the file system.

6. The data storage system of claim 1, wherein:
the object storage system comprises a key-value store; and
archiving the cluster of associated files from the file system to the object storage system comprises:
compressing the cluster of associated files into a compressed object;
storing the compressed object in the object storage;
generating metadata for the compressed object; and
storing the metadata in the key-value store.

7. The data storage system of claim 6, wherein storing the metadata in the key-value store comprises:

storing the metadata as key-value pairs in the key-value store; and indexing the key-value pairs in an index of the key-value store.

8. The data storage system of claim 7, wherein the operations further comprise:

receiving a request for an archived file;

searching the index of the key-value store for the archived file;

retrieving a path of the compressed object containing the archived file using a corresponding key stored in the key-value store; and restoring the associated files from the compressed object stored in the object storage to the file system at respective original file paths.

9. The data storage system of claim 8, wherein restoring the associated files from the compressed object stored in the object storage to the file system using the respective original file paths further comprises:

retrieving the compressed object from the object storage;

decompressing the archived file and the associated files from the compressed object; and restoring the associated files in the file system at the respective original file paths.

10. The data storage system of claim 8, wherein the operations further comprise:

deleting the compressed object from the object storage; and updating the index of the key-value store to reflect the deletion of the compressed object.

11. A computer-implemented method comprising:

polling for one or more dormant files stored in a file system of a computing device;

determining, based on the one or more dormant files:

a plurality of file sets including the one or more dormant files; and corresponding transactions targeting the plurality of file sets;

determining, using machine learning logic, a tree-like data structure of relationships among files in the plurality of file sets and transactions targeting each file;

determining, based on the tree-like data structure, a cluster of associated files including the one or more dormant files;

archiving the cluster of associated files from the file system to an archival object storage system coupled to the file system via a computer network; and deleting the associated files comprising the cluster of associated files from the file system.

12. The computer-implemented method of claim 11, further comprising:

receiving a request for an archived file at the computing device;

identifying the cluster of associated files containing the requested archived file in the archival object storage system;

restoring the associated files including the requested archived file to the file system, the requested archived file now comprising a restored file system file; and performing an operation associated with the restored file system file.

13. The computer-implemented method of claim 11, further comprising:

filtering the plurality of file sets to determine a plurality of frequent file sets based on access frequency, wherein the machine learning logic generates the cluster of associated files based on the frequent file sets.

14. The computer-implemented method of claim 13, further comprising:

determining, based on the tree-like data structure, support counts for the plurality of file sets;

determining, based on the support counts, a confidence score for each association rule of a plurality of association rules for the plurality of file sets;

selecting, based on confidence scores for the plurality of association rules, accepted rules for the plurality of file sets; and applying the accepted rules for the plurality of file sets to determine the cluster of associated files in the file system.

15. The computer-implemented method of claim 11, wherein archiving the associated files from the file system to the archival object storage system comprises:

compressing the associated files into a compressed object;

storing the compressed object in object storage;

generating metadata for the compressed object and the associated files compressed into the compressed object;

indexing the metadata for searching; and responsive to indexing the metadata for searching, deleting the associated files from the file system and a temporary storage used during the archiving.

16. The computer-implemented method of claim 15, wherein indexing the metadata for searching comprises:

storing the metadata as key-value pairs in a key-value store; and indexing the key-value pairs in an index of the key-value store.

17. The computer-implemented method of claim 16, further comprising:

receiving a request for an archived file;

searching the index of the key-value store for the archived file;

retrieving a path of the compressed object containing the archived file from the key-value store; and restoring the associated files from the compressed object to the file system at respective original file paths.

18. The computer-implemented method of claim 17, wherein restoring the associated files from the compressed object to the file system at the respective original file paths further comprises:

retrieving the compressed object from the object storage;

decompressing the archived file and the associated files from the compressed object; and restoring the associated files from the archived file in the file system at the respective original file paths.

19. A storage system comprising:

a processor;

a memory;

means, stored in the memory for execution by the processor, for polling for one or more dormant files stored in a file system of a computing device;

means, stored in the memory for execution by the processor, for determining, based on the one or more dormant files:

a plurality of file sets including the one or more dormant files; and corresponding transactions targeting the plurality of file sets;

means, stored in the memory for execution by the processor, for determining, using machine learning logic, a tree-like data structure of relationships among files in the plurality of file sets and transactions targeting each file;

means, stored in the memory for execution by the processor, for determining, based on the tree-like data structure, a cluster of associated files including the one or more dormant files; and means, stored in the memory for execution by the processor, for archiving the cluster of associated files from the file system to an object storage via a computer network.

20. The storage system of claim 19, further comprising:

means, stored in the memory for execution by the processor, for receiving a request for an archived file at the computing device;

means, stored in the memory for execution by the processor, for identifying the cluster of associated files containing the requested archived file in the object storage;

means, stored in the memory for execution by the processor, for restoring the associated files including the requested archived file to the file system to their respective original locations, the requested archived file now comprising a restored file system file; and means, stored in the memory for execution by the processor, for performing an operation associated with the restored file system file.

* * * * *